United States Patent [19]

Fenolia et al.

[11] Patent Number: 4,894,125

[45] Date of Patent: Jan. 16, 1990

[54] OPTICALLY BLACK PLIABLE FOILS

[75] Inventors: Robert J. Fenolia, Broomfield; Donald F. Shepard, Evergreen; Sharon L. Van Loon, Conifer, all of Colo.

[73] Assignee: Martin Marietta Corporation, Bethesda, Md.

[21] Appl. No.: 196,497

[22] Filed: May 20, 1988

[51] Int. Cl.[4] .................. C25D 5/36; C25D 5/44; F24J 2/36

[52] U.S. Cl. .................. 204/33; 204/32.1; 204/34; 204/51; 126/901; 126/426; 428/469; 428/472; 428/689; 428/702

[58] Field of Search .................. 204/27, 28, 32.1, 33, 204/34, 51; 126/901, 426; 428/469, 472, 702

[56] References Cited

U.S. PATENT DOCUMENTS

| | | | |
|---|---|---|---|
| 3,454,474 | 7/1969 | Woods et al. | 205/51 |
| 3,723,261 | 3/1973 | Byers et al. | 204/51 |
| 4,356,815 | 11/1982 | Spanoudis | 126/443 |
| 4,585,530 | 4/1986 | McMullen et al. | 204/34 |

OTHER PUBLICATIONS

43rd Annual Metal Finishing Guidebook Directory, Metals and Plastics Publications, Inc., (1975), p. 186.

*Primary Examiner*—T. Tung
*Assistant Examiner*—David G. Ryser
*Attorney, Agent, or Firm*—Tarolli, Sundheim & Covell

[57] ABSTRACT

The present invention relates to a composite ductile metal foil having an optically black surface comprising a metal foil substrate having a thickness effective for shaping and reshaping; a black chromium surface applied to at least one side of said substrate by electrodeposition; said surface having a solar absorptivity of at least about 0.95; an emissivity in the range of about 0.4 to about 0.8; and an adhesion strength effective to resist spalling when a two inch by two inch sample of said composite foil is subjected to repeated deformation around a one mil diameter mandrel. In a preferred embodiment of the present invention, the substrate is molybdenum.

13 Claims, No Drawings

OPTICALLY BLACK PLIABLE FOILS

BACKGROUND OF THE INVENTION

This invention was made with United States government support under contract F33615-85-C-5056 awarded by the Department of the Air Force.

The present invention relates to composites having an optically black surface, and to a method of making such composites.

BRIEF DESCRIPTION OF THE PRIOR ART

The plating of black chromium onto metallic substrates is well known. Usually, these surfaces are applied by electroplating from an aqueous bath containing a chromium solution, using the metallic substrate as the cathode. Normally, the metallic substrates are rigid bodies, and prior patents in the field have been directed to improvements or changes in the electrode bath or in the application process, to achieve desired properties.

It is known to apply optically black coatings to plastic substrates. For instance, such products are marketed by Sheldahl, Inc. of Northfield, Minn. and 3M. The problem with such products is that they are capable of withstanding temperatures only up to about 250° F., the temperatures which the substrates are capable of withstanding.

Prior U.S. Pat. No. 4,356,815, issued Nov. 2, 1982, to Spanoudis, discloses a foil substrate having applied to one surface a solar selective, semiconductor material that is capable of absorbing in the solar spectrum and that is essentially transparent in the infrared spectrum, and to the opposite surface, an emissive coating providing relatively high emissivity in the infrared spectrum. Specific semiconductor materials listed include black chrome, black nickel, black platinum, black molybdenum, black copper, black iron, black cobalt, black manganese and compatible alloys thereof. Although it is stated in the patent that application of the semiconductor materials can be made by electroplating, vapor or vacuum deposition, cladding, hot dipping and the like, no details of these processes are given. Foil thickness is about 0.5 to about 15 mils, the thickness of the coatings being about 0.03-5 mils.

In order to achieve a black chrome coating which has a low emissivity and is essentially transparent in the infrared spectrum, it is generally necessary for the substrate to be very smooth, even polished, as contrasted with roughened or etched. It is applicants' experience that black chrome applied to the surface of a foil substrate, wherein the surface is smooth, at a thickness sufficient to obtain a high emissivity, is subject to spalling from repeated shaping.

In the Spanoudis patent, the intended use of the coated foil is a solar collector, and in such application, the coated foil is either positioned within a collector and held in place by gravity, or anchored in some way to a surface, such as by ties and the like. There is no reference to removal of the coated foil from the collector, reshaping the same, or to the requirement of strength and adhesion of the coatings to the substrate.

It is known to pretreat a metallic substrate prior to application of a black chrome coating. Prior U.S. Pat. No. 3,723,261 in column four refers to "thoroughly cleaning" the surface so as to be free of traces of grease. In prior U.S. Pat. No. 2,985,567, column two indicates that if the substrate metal is other than nickel, it should be given a strike coating of nickel to obtain a uniform black chromium coating. It has been applicants' experience that even application of a strike coating to a foil substrate fails to provide a product capable of repeated flexure without coating loss.

BRIEF SUMMARY OF THE INVENTION

The present invention resides broadly in a composite ductile metal foil having an optically black surface comprising: a metal foil substrate having a thickness and ductility effective for shaping and reshaping thereof; a black chromium surface applied to at least one side of said substrate by electrodeposition; said surface having a solar absorptivity of at least about 95%; an emissivity in the range of about 0.4 to about 0.8; and an adhesion strength effective to resist spalling of said surface (as observed with a three-power magnification) when a two inch by two inch sample of said composite foil is subjected to repeated bending or deformation around a one mil diameter mandrel.

In a preferred embodiment of the present invention, the metal substrate is molybdenum.

The present invention also resides in a composite foil as above defined which is stable in a space environment, and is capable of withstanding temperatures up to about 450° C.

The present invention further resides in the discovery of a novel method for the application of a black chromium surface to a metal foil substrate, and product obtained thereby, which includes the step of subjecting the foil substrate to etching prior to electrodeposition. Preferably, the surface of the substrate is also subjected to pickling.

In a preferred embodiment of the process of the present invention, molybdenum is employed as a substrate and the substrate surface to which the black chromium is to be applied is activated by the steps comprising: etching said surface by immersion in a nitric acid/hydrofluoric acid bath; desmuting said surface; and pickling said surface in a hydrochloric acid bath. Preferably the desmuting is carried out in a bath containing chromic acid, acetates and acetic acid.

DETAILED DESCRIPTION OF THE INVENTION AND BEST MODE

For purposes of the present application, the term "optically black" means capable of energy absorption in both the visible (solar) region and the infrared region. In such spectral regions, the composite foils of the present invention have an absorptivity of solar radiation of at least about 95%, and a high emissivity in the infrared region in the range of about 0.4 to about 0.8.

Also, for purposes of the present application, the following terms have the following meanings: "Adhesion strength" means the strength of adhesion of the optically black surface to the metallic substrate. An important property of the plated foils of the present invention is surface adhesion and toughness, which permits repeated reshaping without surface fracture or loss (spalling).

By the term "stable to a space environment", it is meant that the composite foils of the present invention are capable of withstanding thermal cycling, vacuum without significant outgassing, and exposure to electrons, protons, ultraviolet, visible, and infrared radiation, and atomic oxygen fluxes. The surface withstands repeated exposure alternately to extremely high temperatures and extremely low temperatures without failure.

Specifically, the composite foils of the present invention can be held successively at liquid nitrogen temperature and boiling water temperature, through repeated cycling, without degradation. Temperature-wise, the composite foils of the present invention are capable of withstanding temperatures up to about 450° C. without loss of the "optically black" properties, adhesion, or ductility. Since the surface is inorganic, and, to a large part, inorganic oxides, it is not expected to outgas or be effected by the space environment.

The term "desmuting" means removal of the reaction product (smut) remaining upon a surface of the metal foil following etching.

"Etching" means subjecting the surface of the metallic foil to a chemical bath effective to clean and roughen the surface of the metal foil substrate to which the black chrome plate is to be applied. In the practice of the present invention, the etching is carried out to a dull or matte surface.

The term "pickling" means conditioning of the metal substrate by chemical activation.

SUBSTRATE

The substrate portion of the composite foil of the present invention can be any metallic foil having sufficiently high use temperature (greater than about 300° C.) and being sufficiently flexible or pliable (ductile) that it can be shaped; and at the same time sufficiently stiff that it retains such shape under normal or expected use conditions.

Broadly, the metal foil should have a thickness that it can be characterized as self-supporting. Preferably the thickness of the metal foil is such that the foil is hand-deformable. The actual thickness of the foil will be dependent upon the particular metal employed, and will vary from application to application and metal to metal. Examples of suitable foil thicknesses are; Nickel 201 - 0.5 to 5 mils; Molybdenum - 0.2 to 5 mils; Aluminum - 0.5 to 5 mils. For most applications and metals, the foil will have a thickness of from 0.5 mils to two mils.

The metal foil has to be electrically conductive to be employed as a substrate for electrodeposition of the chrome black of the present invention. Basically, almost any metal can be employed. Examples of such metals include: molybdenum, nickel, aluminum, steel, copper, tin, titanium, silver, gold, tungsten, tantalum, steel and alloys thereof. A preferred metal in the practice of the present invention is molybdenum. Black chromium plated foils prepared according to the present invention, using molybdenum as the substrate, were found to be exceptionally resistent to optical degradation at temperatures up to about 450° C. These metal foils are also capable of being shaped and reshaped repeatedly without metal fatigue. Other metals that enjoy these particular properties are stainless steel, nickel, titanium, and tantalum. The present invention has also been successfully practiced using either nickel, aluminum, or titanium as the foil substrate.

BLACK CHROMIUM BATH AND PROCEDURE

Black chromium baths suitable for electrodeposition, and electrodeposits obtained therefrom are well known and well described in prior patents and publications. Examples of such baths are disclosed in prior U.S. Pat. Nos. 2,623,847 by Gilbert, et al.; 2,739,109 by Quaely; 2,985,567 by Pinkerton; and 2,723,261 by Byers, et al. As indicated above, these and other patents and publications generally address the bath composition and/or electroplating conditions to achieve desired properties.

Also in the prior art is prior patent No. 3,620,935 by Willson. This patent describes a black chromium aqueous bath containing hexavalent chromium, trivalent chromium and a lower aliphatic carboxylic acid such as acetic acid. The composition of the '935 patent is marketed by Harshaw Chemical Company under the trademark "Chromonyx". The disclosure of the '935 patent is incorporated by reference herein.

It is important that the bath have a high throwing power, i.e., ability to plate well onto large areas, such as a continuous foil substrate, and onto irregular surfaces.

A preferred bath that has high throwing power and has given excellent results in the practice of the present invention is one marketed by M&T Chemicals, Inc. under the trademark "M&T Black Chromium". This bath is prepared by dissolving in deionized or distilled water, which makes up about two-thirds (by weight) of the bath, prescribed amounts of chromic oxide ($CrO_3$), an oxalic acid mixture, sodium nitrate solution having free sodium ions, and an organic aliphatic acid. The ratio of oxalic acid mixture (which is about 5% oxalic acid in an inorganic acid) to chromic oxide solution (which is about 80% chromic oxide) is about 1:10. The sodium nitrate solution is about 15% sodium nitrate an 10% of a sodium salt in an inert liquid. This solution is added in an amount equal to about 1% by volume of the entire bath. The organic aliphatic acid is added in an amount of about ten grams per liter of bath.

Broadly the thickness of the black chromium layer can be from about 2 microns to about 5 microns. The thickness elected is determined by the emissivity desired and plating should be carried out for a period of time effective to give the appropriate energy absorption in the infrared region; specifically for a period of time to achieve an emissivity of about 0.4 to about 0.8. Essentially, the emissivity is a function of the thickness of the black chromium layer.

The particular plating conditions employed are determined by the type of bath and substrate. With the use of the M&T bath, the plating is carried out at a temperature of about 23° C., plus or minus 2° C., with a current density of one ampere per square inch, plus or minus one tenth, using a lead/tin anode.

In the practice of the present invention, presensitizing the metal substrate is necessary. In all instances, the metal substrate is first degreased using a degreasing agent. One degreasing agent satisfactorily employed has been "Oakite NST", a metal finishing soap marketed by Oakite Products, Inc., Berkeley Heights, N.J. Commercially available industrial detergents can also be employed.

A critical step in the practice of the present invention is etching, carried out by exposing the metal substrate, following degreasing, to an etch. The composition of the etch depends upon the substrate material used, and different etch solutions will be known to those skilled in the art. In the case of molybdenum, etching was carried out satisfactorily with a bath of 40% by volume of concentrated nitric acid plus 2% by volume of 49% hydrofluoric acid, the remainder being deionized water. The bath was maintained at 23° C., plus or minus 3° C. In the case of nickel, etching was carried out using a 25% sulfuric acid by volume solution in water at 23° C., plus or minus 3° C. In the case of aluminum, etching was carried out with a 50% by weight caustic solution in deionized water; i.e., 50% by weight sodium hydroxide.

As indicated above, etching should be carried out to a dull or matte surface.

Preferable, the metal substrates in the practice of the present invention are also exposed to desmuting or smut removal following etching. The particular order or sequence of steps is critical, and should be optimized for the particular substrate involved. For instance, in the case of molybdenum, etching was carried out prior to pickling, the etching step being followed immediately by desmuting. Pickling was carried out in a hydrochloric acid solution. In the case of aluminum, etching and desmuting were also carried out prior to pickling.

APPLICATIONS

It is contemplated that the foil composites of the present invention will have numerous applications and/or uses, for instance, as black tape for stray light, solar absorption, and thermal control. One example is use within a telescope to control stray light, produced as a result of surface damage, not only in the visible region, but also in the infrared region. The composites of the present invention will also find use as reshapable light shades for specific conditions during laser or optical experimentation; e.g., with optical boxes, or on an optical bench, for instance to cover optical bench rivets, screws, or unused holes. The films of the present invention also can be incorporated into numerous space applications, for instance as energy absorbers or flexible radiators, providing a surface which can be directionally oriented, rolled for storage, for instance onto a reel, and unrolled or deployed when needed. The highly reflective and high melting point substrate (for instance, molybdenum has a melting point of 2,610° C.) combined with the radiator capabilities of the foil surface makes it potentially suitable for numerous Strategic Defense Initiative applications.

Since the black foil composite of the present invention is resistant to spalling and inert to most space environments, the composites of the present invention are ideally suited for spacecraft optical systems. The composites of the present invention also are suitable as optically black thermally conductive electromagnetic interference tapes.

EXAMPLE 1

This example illustrates the practice of the present invention using a molybdenum foil as the substrate. In this example, only one side of the foil was plated, the opposite side being masked using an enamel or other suitable masking material.

The surface to be plated was first abraded or uniformly roughened to assure adequate contact during the electrodeposition process. Roughening can be carried out with commercially available materials such as "ScotchBrite 96" (a general purpose scouring pad marketed by 3M) followed by steel wire racking or other standard procedures. Following rinsing, the substrate was immersed in a degreasing agent, for instance Oakite NST, for a sufficient period of time to remove fingerprints, grease and the like. With Oakite NST, cleansing was carried out for five to ten minutes at 50°±3° C.

After a second rinse, the substrate was subjected to etching in the nitric acid, hydrofluoric acid solution referenced above at 23°±3° C., and held immersed in such solution until a uniform evolution of hydrogen began to occur across the surface of the molybdenum foil, and then for 15 seconds thereafter.

Following etching, the substrate was immediately immersed in a desmuting bath to remove smut (oxides, etc.) formed on the surface of the substrate.

A preferred desmuting bath surprisingly was found to be the commercially available black chromium electroplate composition marketed by Harshaw Chemical Company under the trademark "Chromonyx". This bath contains acetic acid along with acetates which are believed to help make the surface of the molybdenum particularly surface active for subsequent electroplating with the M&T black chrome. Employing conventional desmuting agents such as hexavalent chromium in sulfuric acid was effective in desmuting the surface but failed to activate the surface as well as "Chromonyx" for subsequent electroplating of the black chrome.

It should be noted that the desmuting in this instance was carried out by simple immersion at 23°±3° C., without electrolyzing, even though the solution used was a commercially available electroplating solution.

Also, for optimum results, the etching and desmuting was intensive; i.e., repeated three times, each time being followed by careful rinsing, until the surface appeared a uniform dull black. (after etching but before the last desmuting)

Following desmuting, the molybdenum foil was then pickled in a 50% hydrochloric acid solution for three to five minutes. Pickling was carried out at 23°±3° C.

Careful rinsing was again carried out on the substrate followed by immersion in the M&T black chromium solution, and electroplating at 23°±3° C. at 1±0.1 ampere per square inch. In the electroplating step, samples having a thickness of 0.5 mil, 1.0 mil, and 2.0 mils all were successfully plated. The 1 0 mil thick samples were plated at times varying from 5 minutes to 20 minutes. Five minutes plating time gave an emissivity of about 0.55 and 20 minutes plating time gave an emissivity of about 0.61. For all of the samples measured, the absorptivity varied from 0.97 to 0.98. The procedure was completed by final rinsing and drying, and mask removal.

The thickness of the surface in all instances was uniform. The composite foils were capable of withstanding exposure to temperatures up to about 450° C., and resisted spalling when subjected to repeated bending over a one mil diameter mandrel. The absence of spalling was observed with three-power magnification.

EXAMPLE 2

This example illustrates electrodeposition of black chrome onto a nickel substrate. The abrasion and surface cleansing steps of Example 1 were employed. Activation of the surface, however, was carried out by immersion of the nickel foil substrate into a 25% sulfuric acid etch bath and by electrolytic etching. The nickel etching procedure used comprised two minutes at 0.4 amperes per square inch with the substrate as the anode; two minutes at 0.4 amperes per square inch with the substrate as the cathode; one minute at one ampere per square inch anodically; and 15 seconds at one ampere per square inch cathodically. It produced a dull or matte surface. Following rinsing, the foil was ready for plating. Black chrome plating was carried out following the procedure of Example 1.

Samples that were electroplated had thicknesses of 0.5 mil, 1.0 mil, and 2.0 mils respectively. Two of the 2.0 mil thick samples were electroplated for five minutes and seven minutes, respectively. The sample electroplated for five minutes had an emissivity of 0.42, and the sample electroplated for seven minutes had an emissivity of 0.65. All of the samples measured had an absorptivity in the range of about 0.98 to 0.99. All of the samples resisted spalling when subjected to the bend test of this invention.

EXAMPLE 3

This example illustrates the electrodeposition of black chromium directly onto aluminum. Here also, the surface roughening and cleansing steps of Example 1 were followed.

Following a careful rinse, the aluminum substrate was etched in a caustic solution which could be a commercial type solution or 50% sodium hydroxide. Desmuting in this example followed careful rinsing and was carried out in a commercial aluminum deoxidizer/desmuter, a chromic/nitric acid solution marketed under the trademark "Amchem 7-17", by Amchem Products, Inc., Ambler, Pa.

Following desmuting, the aluminum substrate was subjected to zincating or application of a ZnO layer which inhibits corrosion and provides better bonding. Conventional zincate solutions contain sodium hydroxide, zinc oxide and sodium potassium tartrate. The zincate solution employed was "Alumon-D" marketed by Ethone, Inc., New Haven, Conn. This was followed by pickling in a 50% nitric acid solution for 30–60 seconds. The zincating and pickle steps were repeated a total of three times. Black chrome plating was carried out following the procedure of Example 1. In the above examples, absorptivity and emissivity were measured using a Gier-Dunkle MF-251 solar reflectometer and a Gier-Dunkle DB-100 infrared reflectometer.

Having described a preferred embodiment of the invention, the following is claimed:

1. A composite ductile metal foil having an optically black surface comprising:
   a. a metal foil substrate having a thickness effective for shaping and reshaping;
   b. a black chromium surface applied to at least one side of said substrate by electrodeposition, said black chromium surface having:
      1. a solar absorptivity of at least about 0.95;
      2. an emissivity in the range of about 0.4 to about 0.8; and
      3. an adhesion strength effective to resist spalling when a two inch by two inch sample of said composite foil is subjected to repeated deformation around a one mil diameter mandrel.

2. The composite foil of claim 1 wherein said metal foil substrate is molybdenum.

3. The composite foil of claim 1 wherein said metal foil substrate is selected from the group consisting of nickel, stainless steel, aluminum, titanium and tantalum.

4. The composite ductile metal foil of claim 1 stable to a space environment and use up to a temperature of about 450° C.

5. A process for the preparation of ductile composite means foils having an optically black surface comprising the steps of:
   a. etching a surface of a metal foil substrate to a dull or matte surface;
   b. immersing said metal foil substrate as the cathode in a black chromium electroplating bath; and
   c. electrochemically applying to said metal foil substrate a black chromium surface having a thickness effective to give a surface emissivity in the range of about 0.4 to about 0.8 and a solar absorptivity of at least about 0.95;
   d. said black chromium surface having an adhesion strength effective to resist spalling when a two inch by two inch sample of said composite foil is subjected to repeated deformation around a one mil diameter mandrel.

6. The process of claim 5 wherein said metal foil substrate is molybdenum.

7. The process of claim 6 wherein said etch is carried out in a nitric acid/hydrofluoric bath.

8. The process of claim 6 comprising the steps, prior to etching, of: degreasing said surface of the metal foil substrate; said surface etching being carried out by immersion in a nitric acid/hydrofluoric acid bath; removing smut from said surface formed in the nitric acid/hydrofluoric acid bath; and pickling in a hydrochloric acid bath.

9. The process of claim 8 wherein the removal of smut is carried out by exposure of the surface of the metal foil substrate to a chromic acid bath containing acetic acid and acetates.

10. A ductile composite metal foil prepared by the process of claim 9.

11. The process of claim 5 wherein said metal foil substrate is selected from the group consisting of nickel, stainless steel, aluminum, titanium and tantalum.

12. The process of claim 5 wherein said composite metal foil is stable to a space environment and use to a temperature of about 450° C.

13. A ductile composite metal foil prepared by the process of claim 5.

* * * * *

UNITED STATES PATENT AND TRADEMARK OFFICE
CERTIFICATE OF CORRECTION

PATENT NO. : 4,894,125

DATED : January 16, 1990

INVENTOR(S) : Robert J. Fenolia, Donald F. Shepard, Sharon L. Van Loon

It is certified that error appears in the above-identified patent and that said Letters Patent is hereby corrected as shown below:

Column 8, Line 10, Claim 5, Change "means" to --metal--.

Signed and Sealed this

Sixteenth Day of July, 1991

Attest:

HARRY F. MANBECK, JR.

*Attesting Officer*  Commissioner of Patents and Trademarks